United States Patent [19]

Lee

[11] Patent Number: 5,528,333
[45] Date of Patent: Jun. 18, 1996

[54] CAMERA SYSTEM CAPABLE OF CONVERTING BETWEEN A BUILT-IN FLASH AND AN EXTERNAL FLASH AND CONTROL METHOD THEREOF

[75] Inventor: Jin-gi Lee, Changwon-si, Rep. of Korea

[73] Assignee: Samsung Aerospace Industries, Ltd., Kyeongsangnam-do, Rep. of Korea

[21] Appl. No.: 198,258

[22] Filed: Feb. 18, 1994

[30] Foreign Application Priority Data

Feb. 19, 1993 [KR] Rep. of Korea .......................... 93-2356

[51] Int. Cl.⁶ .......................................................... G03B 15/06
[52] U.S. Cl. ........................ 354/419; 354/132; 354/149.11
[58] Field of Search ...................................... 354/418, 419, 354/484, 132, 149.11

[56] References Cited

U.S. PATENT DOCUMENTS 5,159,379 10/1992 Shirane et al. ............................ 354/132
5,164,759 11/1992 Yasukawa ................................ 354/132
5,202,719 4/1993 Taniguchi et al. ....................... 354/132
5,357,297 10/1994 Heong et al. ............................ 354/132

FOREIGN PATENT DOCUMENTS 1215 4/1990 Japan.

*Primary Examiner*—Russell E. Adams
*Attorney, Agent, or Firm*—Finnegan, Henderson, Farabow, Garrett & Dunner

[57] ABSTRACT

A camera system capable of automatically switching between a built-in flash and an external flash and including a body and an external flash detachable from the body. The body of the camera system includes a power supply integral therein, a built-in flash integral therein and coupled to the power supply, a device for determining a distance between an object and the body and producing a distance value representing the determined distance, a device for determining brightness and producing a brightness value representing the determined brightness, a device for selecting one of the external flash and the built-in flash based on the distance value and the brightness value, and a device for activating a selected one of the external flash and the built-in flash.

11 Claims, 3 Drawing Sheets

CAMERA SYSTEM CAPABLE OF CONVERTING BETWEEN A BUILT-IN FLASH AND AN EXTERNAL FLASH AND CONTROL METHOD THEREOF

BACKGROUND OF THE INVENTION

1. Field of the Invention

The present invention relates to a camera system with a built-in flash and an external flash detachable from the body of the system.

2. Description of the Related Art

Conventionally, when the user of a camera takes a photograph of an object using a flash externally attached to the camera, the external flash is equipped with a separate power supply independent of the power supply integral in the camera. The conventional camera typically provides a conversion switch which is set to activate a selected one of the built-in flash and the external flash. When converted into the external flash, if the camera determines that the illumination provided by the built-in flash is not sufficient, the external flash is illuminated to obtain suitable exposure.

Korean Utility Model Examined Publication Number 90-3589 published on Apr. 28, 1990 and entitled "Camera Flash" discloses a flash of a camera which can be used as an auxiliary flash along with the flash illumination of the camera flash rather than using an auxiliary external light source which is expensive and bulky when auxiliary illumination is necessary due to insufficient of the camera flash.

However, in the conventional camera with an external flash, since the separate power supply should be provided for activating the external flash when the user takes the photograph of the object, the external flash becomes large and heavy. Further, the photograph having insufficient exposure is obtained when the power supply of the external flash is not sufficient to provide adequate illumination.

Yet further, since one of the external flash and the camera (built-in) flash is manually selected, when the external flash is selected, an overexposed photograph is obtained when the distance with respect to the object is relatively short, and when the built-in flash is used, a blurred photographed is obtained when the distance is relatively long.

SUMMARY OF THE INVENTION

The object of the present invention is to overcome the problems and disadvantages of the prior art system.

To achieve this and other advantages in accordance with the purpose of the invention, the camera system capable of automatically switching between a built-in flash and an external flash, as embodied and broadly described herein, includes a body and an external flash detachable from the body. The body includes a power supply integral therein, a built-in flash integral therein and coupled to the power supply, means for determining a distance between an object and the body and producing a distance value representing the determined distance, means for determining brightness and producing a brightness value representing the determined brightness, means for selecting one of the external flash and the built-in flash based on the distance value and the brightness value, and means for activating a selected one of the external flash and the built-in flash.

According to another aspect of the present invention, the method for automatically switching between a built-in flash integral in a camera and an external flash detachable from the camera includes the steps of determining a distance between an object and the camera and producing a distance value representing the determined distance, determining brightness and producing a exposure value representing the determined brightness, selecting one of the built-in flash and the external flash based on the distance value and the brightness value, and activating the selected one of the built-in flash and the external flash.

It is to be understood that both the foregoing general description and the following detailed description are exemplary and explanatory and are intended to provide further explanation of the invention as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

Reference will now be made in detail to the preferred embodiment of the invention, an example of which is illustrated in the accompanying drawings.

Figure 1:
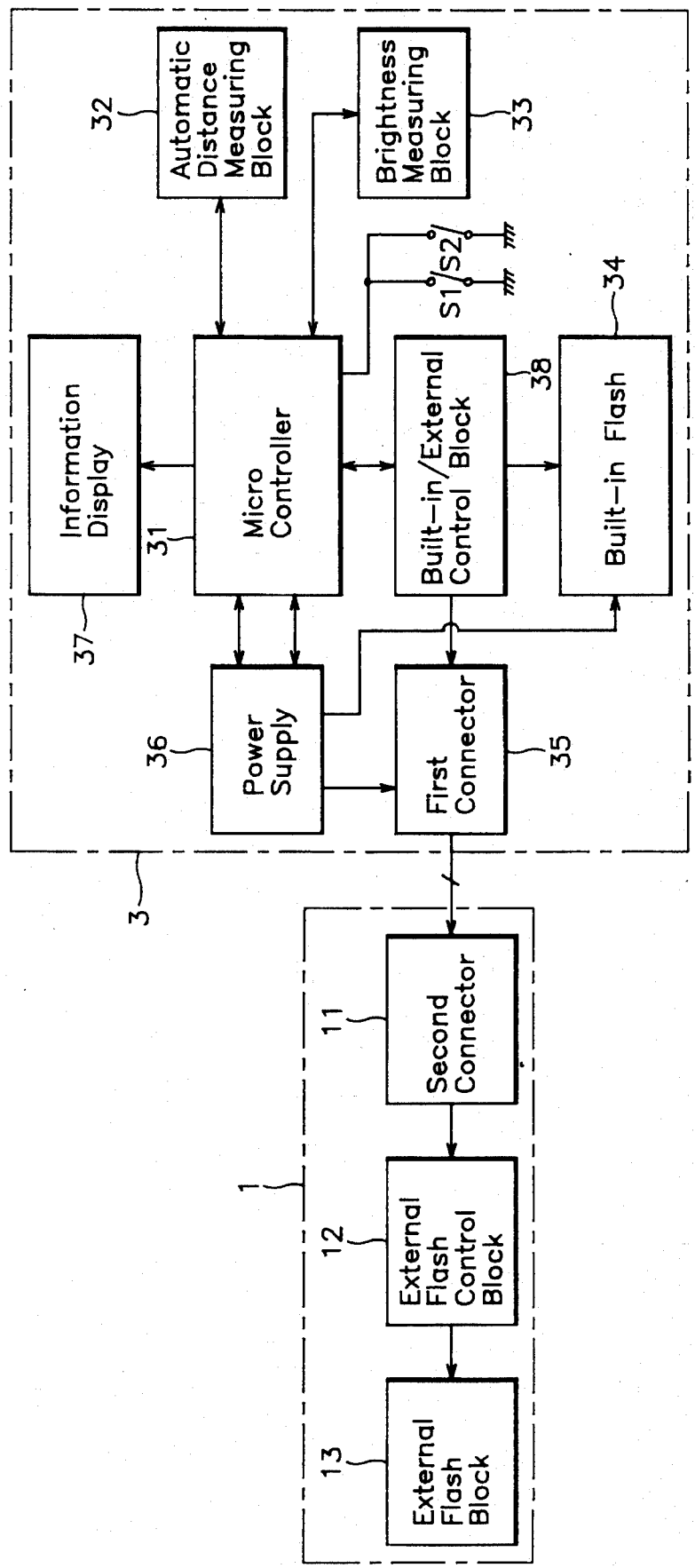
FIG. 1 is a block diagram of the camera system capable of automatic flash conversion according to a preferred embodiment of the present invention.

Referring to FIG. 1, the camera system capable of automatic flash conversion, as embodied herein, includes a camera 3 and an external flash 1 attachable to the camera 3. The camera 3 includes a micro controller 31, an automatic distance measuring block 32, a brightness measuring block 33, a built-in flash 34, a first connector 35, a power supply 36, an information display 37, a built-in/external flash control block 38, a first step release switch S1, and a second step release switch S2.

The external flash 1 includes a second connector 11 connectable to the first connector 35 of the camera 3, an external flash control block 12 connected to the second connector 11, and an external flash block 13.

Figure 2A:
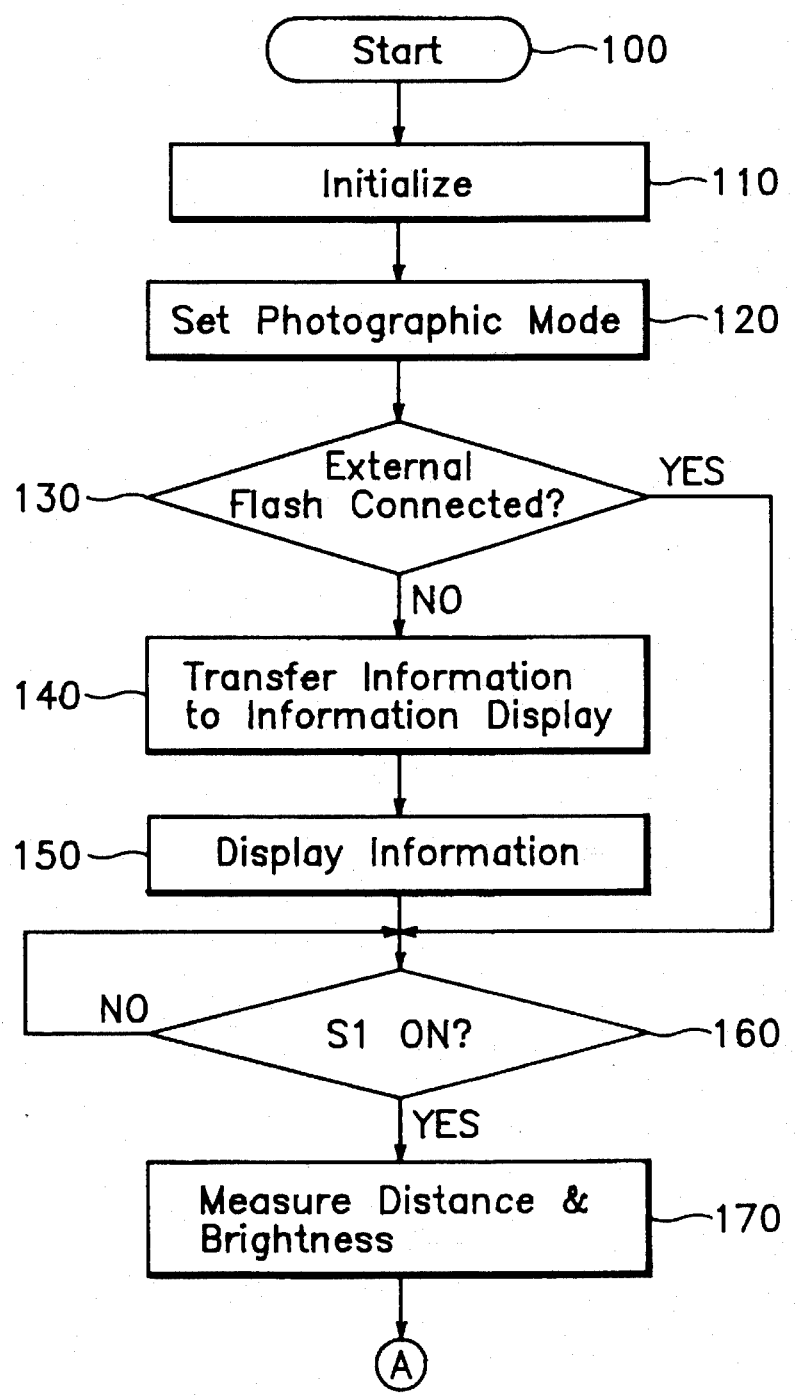
FIG. 2 is a flow chart representing a preferred operational flow of the system of FIG. 1.
Figure 2B:
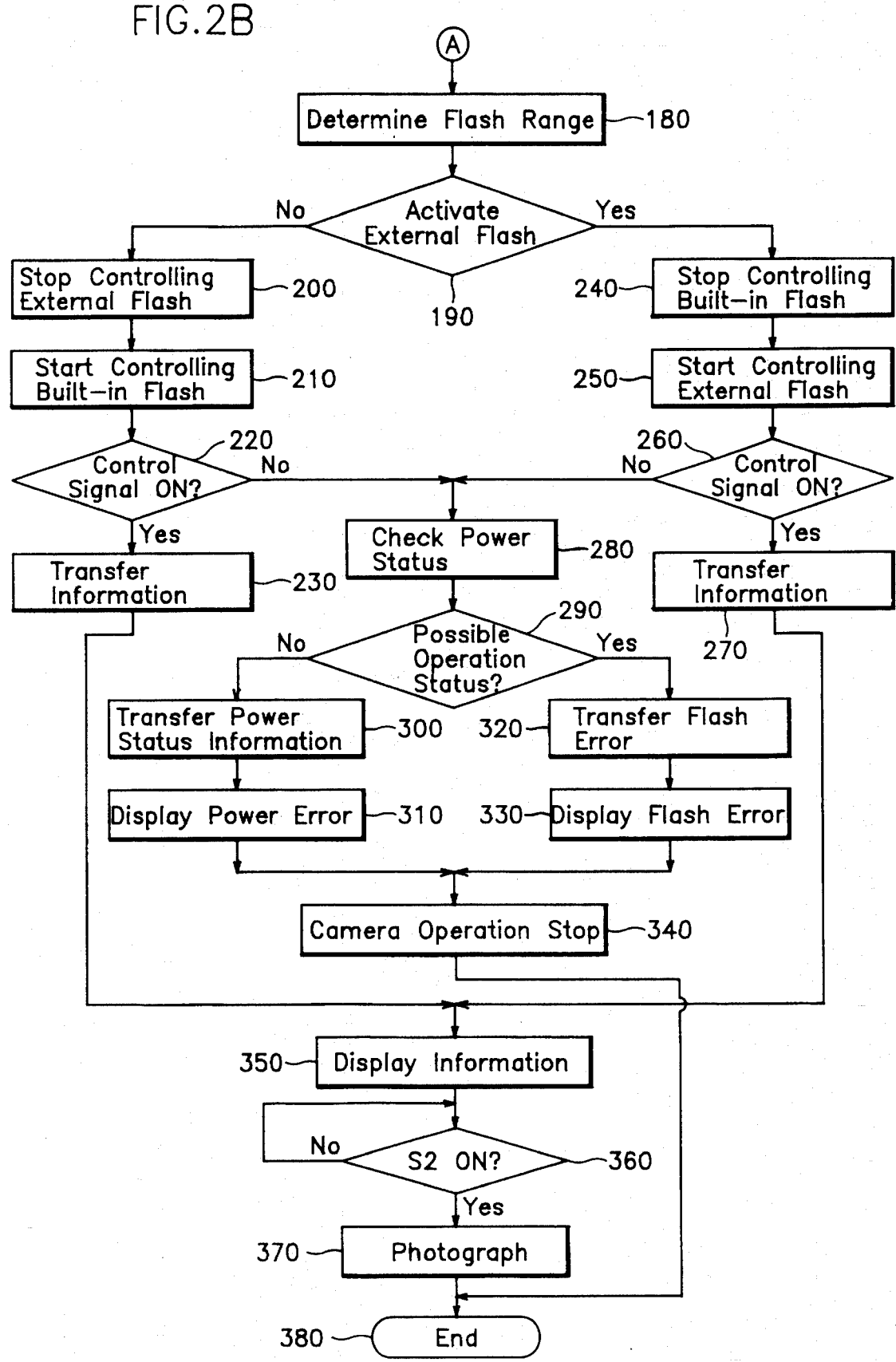

Referring collectively to FIGS. 2 and 3, a preferred operational flow of the camera system, as embodied herein, is described below. When the power supply 36, which is coupled to the micro controller 31, first connector 35, and built-in flash 34, supplies power to the circuitry of the camera 3, the micro controller 31 initializes, i.e., setting to an initial operational state, the internal circuitry of the camera 3. Then, after the user of the camera sets the camera to a photograph mode, the micro controller 31 checks whether or not the external flash 1 is attached to the camera. (Steps 120–130)

After checking whether the external flash 1 is attached, the micro controller 31 checks, through the first connector 35 of the camera 3, whether a signal line is established between the second connector 11 of the external flash 1 and the camera 3. If it is determined that the signal line is established (i.e., means that the external flash 1 is attached to the camera 3), the micro controller 31 checks whether the first step release switch S1 has been activated (i.e., turned "ON").

If it is determined that the signal line is not established, the micro controller 31 transmits to the information display 37 an information signal representing that the external flash 1 is not attached to the camera 3. (Step 140) The information display 37 displays such information to the user. (Step 150) After the information is displayed, the micro controller 31 checks whether the first step release switch S1 has been activated. (Step 160)

If it is determined that the first step release switch S1 has not been activated, the micro controller 31 again checks whether the first step release switch S1 has been activated. If it is determined that the first step release switch S1 has been activated, the automatic distance measuring block 32 measures the distance between the object and the camera and produces a signal corresponding to a measured distance value, and the brightness measuring block 33 ambient measures brightness to provide a signal corresponding to a measured brightness value to the micro controller 31. (Step 170)

Upon receiving the signals from the automatic distance measuring block 32 and brightness measuring block 33, the micro controller 31 determines whether the external flash 1 or the built-in flash 34 should be activated (i.e., energized) based on a guide number GNo as follows:

$$GNo = FNo \times L$$

GNo represents the strength of illumination of the flash, FNo (i.e., F number) the brightness of the lens, and L (i.e., length) the measured distance with respect to the object. (Step 180)

If the brightness of the lens FNo is constant, the strength of illumination of the flash GNo is directly proportional to the measured distance L. Accordingly, if the measured distance n from the object is relatively long, to obtain proper exposure, the strength of illumination of the flash GNo must proportionally increase. On the other hand, if the measured distance L is relatively short, to obtain proper exposure, the strength of illumination of the flash GNo must proportionally decrease.

Therefore, to obtain proper exposure, based on the distance measured by the automatic distance measuring 32, the micro controller 31 activates the external flash 1 if a calculated guide number GNo is greater than a reference value, and alternatively activates the built-in flash 34 if the calculated guide number is smaller than the reference value.

In other words, the strength of illumination of the flash GNo is determined based on the measured distance L and the brightness value FNo. The micro controller 31 determines which one of the external flash 1 and the built-in flash 34 should be activated based on the determined value for GNo. (Step 190)

If it is determined that the built-in flash 34 should be activated, the micro controller 31 transmits to the power supply 36 a control signal to disable the power line which supplies power to the external flash 1 (i.e., cutting off power to the external flash 1) and enable the power line which supplies power to the built-in flash 34 to activate only the built-in flash 34.

In addition, the micro controller 31 transmits to the built-in/external flash control block 38 a control signal to disable (i.e., turn "OFF") the external flash control line which controls the activation of the external flash 1 through the first connector 35. Accordingly, both the external flash control signal line and the power line which are coupled to the second connector 11 of the external flash 1 through the first connector 35 and supplies power to the external flash block 13 are disabled (i.e., turned "OFF"). (Step 200)

After disabling the power line and the external flash control signal line to the external flash 1, the micro controller 31 enables (i.e., turned "ON") the built-in flash control line that is coupled between the built-in external control block 38 and the built-in flash 34, and controls the activation of the built-in flash 34. (Step 210) After determining that the built-in flash control signal is enabled, the micro controller 31 transmits to the information display 37 an information signal representing that the built-in flash 34 is activated and causes the display 37 to inform the user that the present flash is the built-in flash 34. (Step 230)

If it is determined that the external flash 1 (rather than the built-in flash 34) should be activated, the micro controller 31 transmits a control signal to disable the power line which supplies power to the built-in flash 34 from the power supply 36 (i.e., cutting off power to the built-in flash 34) and enable only the power line which supplies power to the external flash 1. Further, the micro controller 31 transmits to the built-in/external flash control block 38 a control signal to disable the built-in flash control line. Accordingly, the power line from the power supply 36 and the external flash control line from the built-in/external flash control block 38 becomes operationally coupled to the second connector 11 of the external flash 1 through the first connector 35 of the camera 3. (Steps 240 and 250)

Further, the micro controller 31 disables the power line and the built-in flash control signal line that are coupled to the built-in flash 34, and checks whether the control signal for controlling the external flash 1 is enabled (i.e., turned "ON"). (Step 260) If it is determined that the external flash control signal is enabled, the micro controller 31 transmits to the information display 37 an information signal representing that the external flash 1 is used and causes the display 37 to display such information to the user. (Step 270)

If both the external flash and built-in flash control signal lines are not enabled, the micro controller 31 checks the power status of the camera. (Step 280) If it is determined that the power status is not normal or sufficient to perform normal camera operations, the micro controller 31 transmits to the information display 37 an information signal representing that the power status of the camera is not normal and causes the display 37 to inform the user (Steps 300 and 310) and causes the camera to cease the operation to prevent malfunctioning of the camera. (Step 340)

On the other hand, if it is determined that the power status is normal but both the external flash and built-in flash control signal lines are not enabled, the micro controller 31 transmits to the information display 37 an information signal representing that these control signal lines are not in proper order and causes such information to be displayed to the user. (Steps 320 and 330) Then the micro controller 31 causes the camera to cease the operation to prevent taking underexposed photographs due to the inactivation of the flash. (Step 340)

As described above, if either one of the external flash and built-in flash control signals is enabled, after causing the information display 37 to inform the user that a flash is selected (Step 350), the micro controller 31 checks whether the second step release switch S2 is activated (turned "ON"). (Step 360) If the built-in flash 34 is selected, and it is determined that the second step release switch S2 has been activated, the micro controller 31 causes the built-in/external flash control block 38 to activate the built-in flash 34 and causes to perform and terminate the photograph taking operation. (Step 370) If the external flash 1 is selected instead, the micro controller 31 causes to enable the power line coupled to the external flash 1 and transmit the external flash control signal to the second connector 11 of the external flash 1 through the first connector 35, enabling the external flash control block 12 and activating the external flash 1 and causing to perform and terminate the photograph. (Steps 370 and 380)

According to the present invention, as embodied herein and described hereabove, since the external flash uses the power of the camera, the need for a separated power supply for the external flash is eliminated. Therefore, the size and weight of the external flash is substantially reduced, the use of the camera becomes easier, and the cost of the camera is reduced. Further, since it is automatically determined which one of the external flash and the built-in flash should be used based on the measured distance with respect to the object and brightness, proper exposure is always guaranteed.

It will be apparent to those skilled in the art that various modifications and variations can be made in the camera system of the present invention without departing from the spirit or scope of the invention. Thus, it is intended that the present invention covers the modifications and variations of this invention that provided they come within the scope of the appended claims and their equivalents.

What is claimed is:

1. A camera system capable of automatically switching between a built-in flash and an external flash, comprising:
   a body; and
   an external flash detachable from said body, said body including:
     a power supply integral therein,
     a built-in flash integral therein and coupled to said power supply,
     means for determining a distance between an object and said body and producing a distance value representing the determined distance,
     means for determining brightness and producing a brightness value representing the determined brightness,
     means for selecting one of said external flash and said built-in flash based on said distance value and said brightness value,
     means for activating a selected one of said external flash and said built-in flash, and
   means for electrically coupling said selected one of said external flash and said built-in flash to said power supply.

2. The camera system of claim 1, wherein said selecting means of said body further includes:
   means for determining a flash illumination value from said distance and brightness values,
   means for comparing said flash illumination value to a reference value, and wherein
   said means for selecting selects one of said external flash and said built-in flash based on a result of the comparison.

3. The camera system of claim 1, wherein said body further includes means for controlling an illumination of said selected one of the built-in flash and external flash based on a flash illumination value derived from said distance and brightness values.

4. The camera system of claim 1, wherein said body further includes means for informing the user of the camera system of said selected one of the external flash and the built-in flash.

5. A camera system capable of automatically switching between a built-in flash and an external flash, comprising:
   a body; and
   an external flash detachable from said body, said body including:
     a power supply for supplying power integral in the body,
     a built-in flash integral in the body,
     flash control means for controlling the illumination of said built-in flash and said external flash,
     means for measuring a distance from the object to the body and producing a distance value representing the measured distance,
     means for measuring ambient brightness and producing an exposure value representing said measured brightness,
     micro controller means for determining a flash illumination value based on said distance and exposure values, and
     means for electrically coupling the power supply to a selected one of said built-in flash and said external flash based on said flash illumination value.

6. The camera system of claim 5, wherein said micro controller meads includes means for comparing said flash illumination value to a reference value and means for selecting one of the external flash and the built-in flash based on the result of the comparison.

7. The camera system of claim 5, wherein said flash control means includes means for controlling the illumination of said selected one of the external flash and the built-in flash based on said flash illumination value.

8. A method for automatically switching between a built-in flash integral in a camera and an external flash detachable from said camera, comprising the steps of:
   determining a distance between an object and the camera and producing a distance value representing the determined distance;
   determining brightness and producing an exposure value representing the determined brightness;
   selecting one of said built-in flash and said external flash based on the distance value and the brightness value; and
   activating said selected one of said built-in flash and said external flash by electrically coupling said selected one of said built-in flash and said external flash to a power supply integral in said camera.

9. The method of claim 8, wherein said selecting step includes the substeps of:
   determining a flash illumination value from said distance and exposure values;
   comparing said flash illumination value to a reference value; and
   selecting one of said external and built-in flashes based on the result of the comparison.

10. The method of claim 8, further comprising the step of controlling an illumination of said selected one of the built-in and external flashes based on a flash illumination value derived from the distance and exposure values.

11. The method of claim 8, further comprising the step of informing the user of the camera of said selected one of the built-in and external flashes.

* * * * *

UNITED STATES PATENT AND TRADEMARK OFFICE
CERTIFICATE OF CORRECTION

PATENT NO. : 5,528,333
DATED : June 18, 1996
INVENTOR(S) : Jin-gi LEE

It is certified that error appears in the above-indentified patent and that said Letters Patent is hereby corrected as shown below:

In claim 6, column 6, line 23, "meads" should read --means--.

Signed and Sealed this

Twenty-sixth Day of November 1996

Attest:

BRUCE LEHMAN

*Attesting Officer*    *Commissioner of Patents and Trademarks*